(12) United States Patent
Wang et al.

(10) Patent No.: US 8,428,593 B2
(45) Date of Patent: *Apr. 23, 2013

(54) METHOD AND APPARATUS FOR SOFT HANDOFF BETWEEN BASE STATIONS USING DIFFERENT FRAME FORMATS

(75) Inventors: Jun Wang, La Jolla, CA (US); Ling Hang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 552 days.

This patent is subject to a terminal disclaimer.

(21) Appl. No.: 12/025,492

(22) Filed: Feb. 4, 2008

(65) Prior Publication Data

US 2008/0146239 A1 Jun. 19, 2008

Related U.S. Application Data

(63) Continuation of application No. 10/150,145, filed on May 17, 2002, now Pat. No. 7,336,954.

(60) Provisional application No. 60/303,261, filed on Jul. 5, 2001.

(51) Int. Cl.
*H04W 4/00* (2009.01)

(52) U.S. Cl.
USPC ............ 455/436; 455/438; 455/439; 455/442

(58) Field of Classification Search .................. 455/442, 455/436, 438, 439
See application file for complete search history.

(56) References Cited

U.S. PATENT DOCUMENTS 5,101,501 A 3/1992 Gilhousen et al.
5,999,815 A 12/1999 TenBrook et al.
(Continued)

FOREIGN PATENT DOCUMENTS

EP 1006746 6/2000
JP 1084584 3/1998
(Continued)

OTHER PUBLICATIONS

Apr. 19, 2001). Advanced Communications Technologies Inc.—SpectruCell—SDR—Base Station Presents Solution to US 3G Spectrum Rollout and Allocation Woes The Free Library. (2001). Retrieved Aug. 27, 2009 from http://www.thefreelibrary.com/Advanced Communications Technologies Inc.—SpectruCell—SDR—Base...-a073387980.*

(Continued)

*Primary Examiner* — Marcos Batista
*Assistant Examiner* — Frank Donado
(74) *Attorney, Agent, or Firm* — Kevin T. Cheatham

(57) ABSTRACT

A method of enabling soft handoff between base stations using different signaling frame formats allows soft handoff from an origination base station supporting a lower Protocol Data Unit revision format to an alternative base station supporting a higher Protocol Data Unit revision format, as well as soft handoff between an origination base station supporting a higher Protocol Data Unit revision format to an alternative base station supporting a lower Protocol Data Unit revision format. The base station using the higher Protocol Data Unit revision format downgrades to the lower Protocol Data Unit revision format for the duration of soft handoff. As all base stations use the same Protocol Data Unit revision format during soft handoff, the signals from all of the receive paths can be combined by a mobile station.

20 Claims, 9 Drawing Sheets

U.S. PATENT DOCUMENTS

| | | |
|---|---|---|
| 6,178,164 B1 | 1/2001 | Wang et al. |
| 6,567,666 B2 | 5/2003 | Czaja et al. |
| 6,609,003 B1 | 8/2003 | Park et al. |
| 7,336,954 B2 | 2/2008 | Wang et al. |

FOREIGN PATENT DOCUMENTS

| | | |
|---|---|---|
| JP | 2000201369 | 7/2000 |
| WO | 98030042 | 7/1998 |
| WO | 0110159 | 2/2001 |
| WO | 0178240 | 10/2001 |
| WO | 02054798 | 7/2002 |

OTHER PUBLICATIONS

International Search Report—PCT/US02/21038 International Search Authority, European Patent Office, Feb. 1, 2003.

European Search Report—EP07001988—Search Authority—The Hague-Jun. 16, 2009.

* cited by examiner

METHOD AND APPARATUS FOR SOFT HANDOFF BETWEEN BASE STATIONS USING DIFFERENT FRAME FORMATS

CLAIM OF PRIORITY UNDER 35 U.S.C. §120

This application is a continuation of application Ser. No. 10/150,145, filed May 17, 2002, entitled "Method and Apparatus for Soft Handoff Between Base Stations Using Different Frame Formats," now allowed, which claims priority to U.S. Provisional Application Ser. No. 60/303,261, filed Jul. 5, 2001 entitled "Method of Soft Handoff Between Base Stations Using Different Signaling Frame Formats," both of which are assigned to the assignee hereof and hereby expressly incorporated by reference herein.

BACKGROUND

1. Field

The presently disclosed embodiments relate generally to wireless telecommunications, and more specifically to a method and apparatus for soft handoff between base stations using different signaling frame formats.

2. Background

The use of code division multiple access (CDMA) modulation techniques is one of several techniques for facilitating communications in which a large number of system users are present. Other multiple access communication system techniques, such as time division multiple access (TDMA), frequency division multiple access (FDMA) and Amplitude Modulation (AM) schemes such as amplitude companded single sideband (ACSSB) are known in the art. These techniques have been standardized to facilitate interoperation between equipment manufactured by different companies. Code division multiple access communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", incorporated by reference herein, and hereinafter referred to as IS-95-B. The IS-95-B standard incorporates the IS-95-A, J-STD-008, and TSB74 standards.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission. The Telecommunications Industry Association is currently developing the cdma2000 proposal as interim standard TIA/EIA/IS-2000, and hereinafter referred to as cdma2000. A second of these proposals was issued by the European Telecommunications Standards Institute (ETSI), entitled "The ETSI UMTS Terrestrial Radio Access (UTRA) ITU-R RTT Candidate Submission", also known as "Wideband CDMA" and hereinafter referred to as W-CDMA. A third proposal was submitted by U.S. TG 8/1 entitled "The UWC-136 Candidate Submission", hereinafter referred to as EDGE. The contents of these submissions is public record and is well known in the art.

The Signaling Layer 2 Link Access Control (LAC) signaling protocol architecture and functionality used to provide the transport and delivery of Open Systems Interconnection (OSI) Layer 3 signaling messages over cdma2000 radio channels is described in TIA/EIA/IS-2000.4-A entitled "Signaling Link Access Control (LAC) Standard for cdma2000 Spread Spectrum Systems", hereinafter referred to as the LAC Standard. The LAC layer is a sublayer of OSI Layer 2. The LAC layer provides correct delivery of signaling messages comprised of signaling frames. Functions provided by the LAC sublayer comprise assured delivery, unassured delivery, duplicate signaling message detection, address control to deliver a signaling message to an individual mobile station, segmentation of signaling messages into suitably sized fragments for transfer over a physical medium, reassembly and validation of received signaling messages, and Global Challenge Authentication.

On the transmit side, the LAC layer receives a LAC Service Data Unit (SDU) from Layer 3 Signaling Services to be transmitted over a logical channel. The SDU is operated on by up to 5 LAC component layers to create an encapsulated LAC Protocol Data Unit (PDU). The encapsulated LAC PDU is segmented into fragments, and the fragments are passed to the Medium Access Control (MAC) layer (also a sublayer of OSI Layer 2) for channel mapping and access to the Physical Layer (OSI Layer 1). On the receive side, the MAC layer supplies LAC PDU fragments to the LAC layer, which reassembles them into complete signaling messages and passes the signaling messages up through the LAC component layers to the Layer 3 Signaling Services. The five component layers of the LAC are the Authentication Sublayer, the Automatic Repeat Request (ARQ) Sublayer, the Addressing Sublayer, the Utility Sublayer, and the Segmentation and Reassembly (SAR) Sublayer.

The format of the PDU has changed with certain releases of the CDMA standards for reasons such as added functionality and increased message efficiency. Each time the PDU format is changed with the release of a new standard, an associated Protocol Revision number is incremented. Protocol Revision numbers are associated with PDU formats supported by mobile stations (MOB_P_REV numbers), and with PDU formats supported by base stations (P_REV numbers). Table 1. specifies the Protocol Revision numbers currently planned or in use, associated by standard. The PDU format for each PDU revision number is specified in the LAC Standard.

TABLE 1

| Standard | P_REV | MOB_P_REV |
| --- | --- | --- |
| J-STD 008 | P_REV 1 | MOB_P_REV 1 |
| IS-95-A | P_REV 2 | MOB_P_REV 2 |
| IS-95-A + TSB 74 | P_REV 3 | MOB_P_REV 3 |
| IS-95-B Phase 1 | P_REV 5 | MOB_P_REV 4 |
| IS-95-B Phase 2 | P_REV 5 | MOB_P_REV 5 |
| IS-2000 Release 0 | P_REV 5 | MOB_P_REV 5 |
| IS-2000 Release A | P_REV 6 | MOB_P_REV 7 |

Table 1

Soft handoff in a CDMA communications system requires combining the contents of two or more receive paths from multiple base stations or multiple sectors of the same base station. The contents of differently formatted PDUs having unlike P_REV numbers cannot be combined during soft handoff. When the receive paths cannot be combined, a successful soft handoff between base stations supporting different PDU P_REVs cannot occur. Such a soft handoff failure could occur during a handoff wherein the origination base station is using a previous, or lower, P_REV than an alternative base station accepting the handoff, or wherein the origination base station is using a subsequent, or higher, P_REV than the alternative base station. Thus, there is a need in the art for soft handoff between base stations using different signaling frame formats, or P_REV numbers.

SUMMARY

Embodiments disclosed herein address the needs for soft handoff between base stations using different protocol data unit format revisions. Accordingly, in one aspect of the invention, a method for soft handoff between base stations using different frame formats includes signaling to a mobile station a change of revision in protocol data unit format revision, communicating, during soft handoff, at a protocol data unit format revision supported by all of the base stations involved in the soft handoff and communicating, after the soft handoff is complete, at a protocol revision determined by the base station supporting the communication.

In another aspect, a method for soft handoff between first and second base stations using different signaling frame formats includes initiating a soft handoff from a first base station to a second base station, wherein a protocol data unit format revision in use by the first base station is lower than a protocol data unit format revision in use by the second base station, configuring the second base station to communicate at the lower protocol data unit format revision of the first base station, directing a mobile station to upgrade, at an action time, to a mobile protocol data unit format revision associated with the higher protocol data unit format revision in use by the second base station before configuration, completing the soft handoff to the second base station, reconfiguring the second base station to communicate at the higher protocol data unit format revision in use by the second base station before configuration and exchanging signaling frames between the mobile station and the second base station using the higher protocol data unit format revision in use by the second base station before configuration.

In another aspect, a method for soft handoff between first and second base stations using different signaling frame formats includes initiating a soft handoff from a first base station to second base station, wherein a protocol data unit format revision in use by the first base station is higher than a protocol data unit format revision in use by the second base station, directing a mobile station to downgrade, at an action time, to a mobile protocol data unit format revision associated with the lower data protocol unit format revision in use by the second base station, configuring the first base station to communicate at the lower protocol data unit format revision of the second base station, completing the soft handoff to the second base station, reconfiguring the first base station to communicate at the higher protocol data unit format revision in use by the first base station before configuration and exchanging signaling frames between the mobile station and the second base station using the lower protocol data unit format revision in use by the second base station.

In another aspect, a mobile station for soft handoff between base stations using different signaling frame formats includes a modem, a transmitter, and an antenna for establishing a wireless connection to a wireless network, a control processor, and a memory coupled to the control processor having code or instructions for directing the control processor to upgrade or downgrade a mobile protocol data unit format revision in use during soft handoff according to received messages.

In another aspect a base station includes a control processor, and a memory coupled to the control processor having program code or instructions for directing the control processor to access instructions in the memory to signal to a mobile station, a change of revision in protocol data unit format revision, communicate, during a soft handoff, at a protocol data unit format revision supported by all of the base stations involved in the soft handoff and communicate, after the soft handoff is complete, at a protocol data unit revision determined by the base station supporting the communication.

In another aspect, a base station includes a control processor and a memory coupled to the control processor having program code or instructions for directing the control processor to access instructions in the memory to initiate a soft handoff to a second base station, wherein a protocol data unit format revision in use is lower than a protocol data unit format revision in use by the second base station, initiate configuration of the second base station to communicate at the lower protocol data unit format revision of the first base station, direct a mobile station to upgrade, at an action time, to a mobile protocol data unit format revision associated with the protocol data unit format revision in use by the second base station and complete the soft handoff to the second base station.

In another aspect, a base station includes a control processor and a memory coupled to the control processor having program code or instructions for directing the control processor to access instructions in the memory to downgrade, during soft handoff, a protocol data unit format revision to provide backward compatibility with a base station using a lower protocol data unit format revision.

In yet another aspect, a base station includes a control processor and a memory coupled to the control processor having program code or instructions for directing the control processor to access instructions in the memory to initiate a soft handoff to second base station, wherein a protocol data unit format revision in use is higher than a protocol data unit format revision in use by the second base station, direct a mobile station to downgrade, at an action time, to a mobile protocol data unit format revision associated with the data protocol unit format revision in use by the second base station, communicate, during the soft handoff, with the mobile station at the lower protocol data unit format revision of the second base station and complete the soft handoff to the second base station.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

Figure 1:
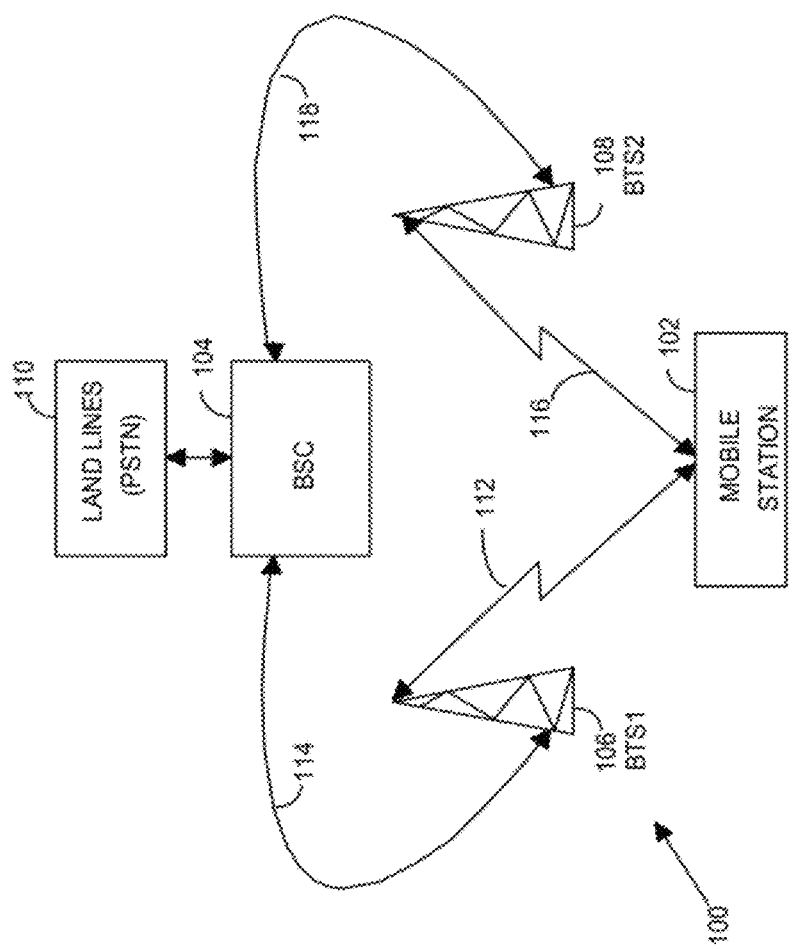
FIG. 1 illustrates an exemplary embodiment of the operation of a wireless communication system during a two-way handoff process.

FIG. 1 illustrates the operation of a system 100 in accordance with one embodiment of soft handoff between base stations supporting different signaling frame format protocol revisions. During a soft handoff, a Mobile Station (MS) 102 communicates with a BTS1 106 and a BTS2 108 in a conventional fashion. That is, data frames are exchanged between the MS 102 and the BTS1 106 as well as between the MS 102 and the BTS2 108. A mobile station may comprise a cellular telephone for mobile subscribers, a cordless telephone, a paging device, a wireless local loop device, a personal digital assistant (PDA), an Internet telephony device, a component of a satellite communication system, or any other component device of a communications system. The MS 102 is initially communicating solely with the BTS1 106. As the MS 102 changes location and begins to communicate with the BTS2 108, it combines the signals from BTS1 106 and BTS2 108.

MS 102 is communicating with a base station controller (BSC) 104 via the Base Transceiver Subsystem (BTS1) 106 and/or the BTS2 108. A wireless communication link 112 couples the MS 102 with the BTS1 106. It should be understood that the wireless communication link 112 includes both a forward link and a reverse link. BTS1 106 communicates with BSC 104 via a conventional bi-directional communication link 114, or backhaul, in a well-known fashion. BSC 104 is coupled to a land line 110, such as a Public Switched Telephone Network (PSTN). The operation of the BSC 104 in communicating via the land line 110 is well known and need not be described in greater detail herein.

FIG. 1 also illustrates a wireless communication link 116 between the MS 102 and BTS2 108. It should be understood that the wireless communication link 116 includes both a forward link and a reverse link. BTS2 108, in turn, communicates with the BSC 104 via a conventional bi-directional communication link 118, or backhaul. The system 100 is particularly useful during a soft handoff because it provides a technique for balancing transmission power of BTS1 106 and BTS2 108. The following description assumes that the MS 102 initially communicates with the BSC 104 via BTS1 106. As the MS 102 moves in the general direction of BTS2 108, the wireless communication link 116 will be established. Under these circumstances, the MS 102 is communicating with both BTS1 106 and BTS2 108. While the MS 102 is communicating with both BTS1 106 and BTS2 108, selector elements (not shown) within the BSC 104 analyze the data received from each BTS to determine which BTS 106, 108 is most appropriate for continued communication with the MS 102.

BTS1 106 and BTS2 108 may support different P_REV numbers. (See Table 1.) As the MS 102 moves towards BTS2 108 and begins to communicate with BTS2 108, as well as BTS1 106, the same frame signal format must be used by both BTSs 106, 108 in order for MS 102 to soft combine the signals. The disclosed embodiments provide a method and apparatus for soft handoff between BTSs 106, 108 supporting different P_REV numbers. In one embodiment, the origination BTS1 106 supports a previous, or lower P_REV number than the alternative BTS2 108. In another embodiment, the origination BTS1 106 supports a subsequent, or higher P_REV number than the alternative BTS2 108.

While the above description relates to BTS1 106 and BTS2 108, those skilled in the art will appreciate that the principles of the disclosed embodiments can be extended to one or more additional BTSs.

Figure 2A:
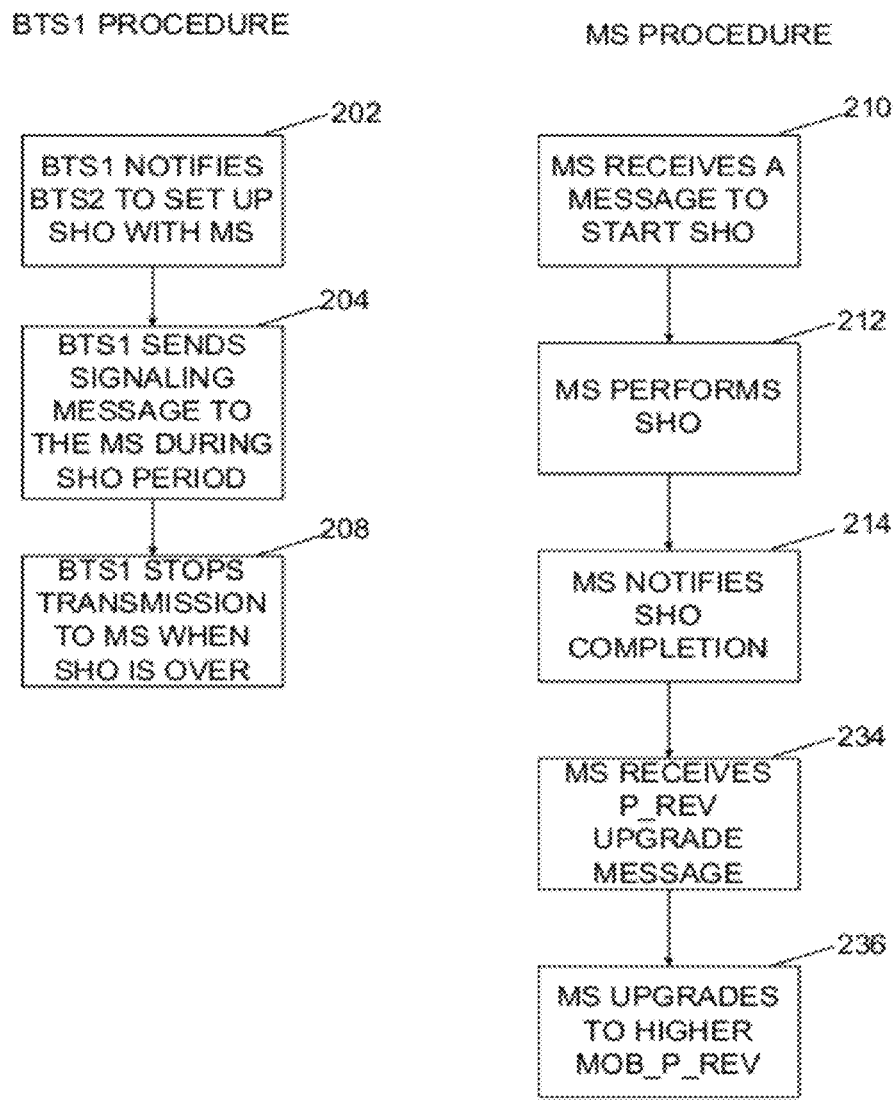
FIG. 2 is a flowchart illustrating steps of soft handoff from a base station supporting a lower frame format protocol revision to a base station supporting a higher frame format protocol revision, in accordance with an exemplary embodiment.
Figure 2B:
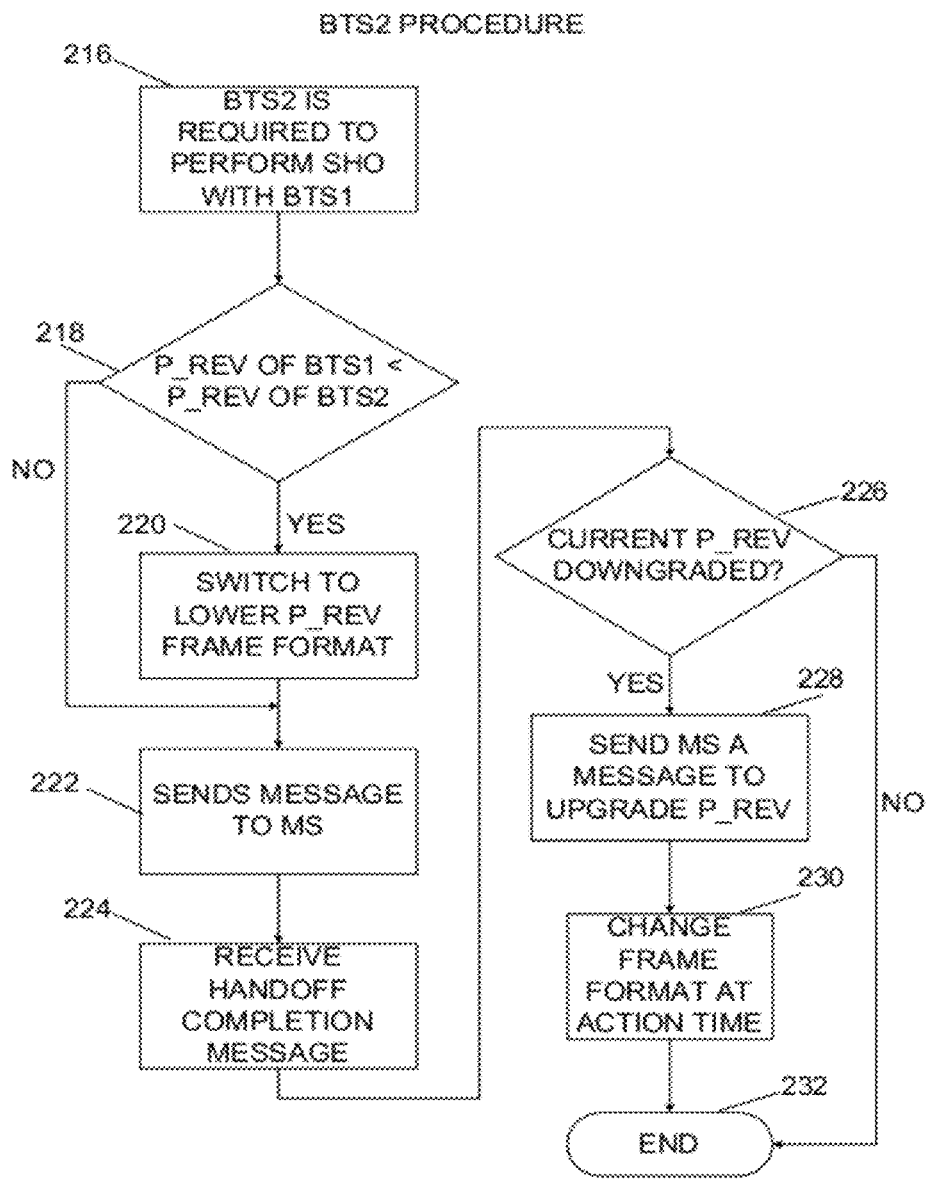

FIG. 2 is a flowchart 200 illustrating steps of soft handoff from an origination BTS1 106 supporting a lower P_REV than the P_REV of an alternative BTS2 108, in accordance with an exemplary embodiment. Because BTS1 106 and BTS2 108 use different frame formats, the signals cannot be combined directly for soft handoff purposes. In order to combine the signals from BTS1 106 and BTS2 108 during soft handoff, the BTS supporting the higher of the two P_REV formats must downgrade to the lower P_REV for backward compatibility. Backward compatibility of base stations allows the alternative BTS2 108 supporting the higher P_REV to emulate the lower P_REV of the origination BTS1 106 during the soft handoff. In an exemplary embodiment, origination BTS1 106 supporting a lower P_REV than BTS2 108 hands off to alternative BTS2 108 as follows: Origination BTS1 106 notifies alternative BTS2 108 to set up a soft handoff, specifying the P_REV currently in use by BTS1 106. BTS2 108, being notified of the lower P_REV in use by BTS1 106, configures itself or is configured by another entity such as BSC 104, to use the lower P_REV signaling frame format specified by BTS1 106. BTS1 106 and BTS2 108 then send identically formatted signaling messages, using the lower P_REV of BTS1 106, that are soft combinable by MS 102. As the MS 102 moves out of the coverage area of BTS1 106 and into the coverage area of BTS2 108, BTS2 108 sends the MS 102 a message notifying MS 102 of an action time to upgrade to the higher MOB_P_REV compatible with the P_REV normally in use by BTS2 108. The action time can be implicit or explicit. An explicit action time specifies the exact time for MS 102 to begin using the higher P_REV supported by BTS2 108. The explicit action time indicates the exact time that MS 102 will cease to soft combine signaling frames from both BTS 106, 108 upon the completion of the handoff. An implicit action time implies implementation of the upgrade to the higher P_REV supported by BTS2 108 as soon as possible. Because the format difference only applies to the signaling portion of the frame, rather than the voice traffic portion of the frame, voice quality is not impacted by the loss of any signaling frames caused by delay in the upgrade due to an implicit action time. One skilled in the art will understand that ordering of steps illustrated in FIG. 2 is not limiting. The method is readily amended by omission or re-ordering of the steps illustrated without departing from the scope of the disclosed embodiments. The disclosed embodiments are described in the context of CDMA phones. However, the disclosed embodiments are equally applicable to other modulation techniques.

Soft handoff from origination BTS1 106 to alternative BTS2 108, which supports a higher P_REV than BTS1 106, begins in step 202 with BTS1 106 signaling BTS2 108 to setup a soft handoff of MS 102 when the MS 102 measures a stronger signal from BTS2 108 than the signal the MS 102 receives from BTS1 106. The soft handoff request made by BTS1 106 includes specification of the P_REV in use by BTS1 106. Control flow proceeds to step 216.

In step 216, BTS2 108 sets up the soft handoff to accept the MS 102 from BTS1 106. Control flow proceeds to step 218.

In step 218, BTS2 108 compares the P_REV of BTS1 106 received in the soft handoff request of step 202 to the P_REV currently in use by BTS2 108. If the P_REV in use by BTS1 106 is not lower than the P_REV currently in use by BTS2 108, control flow proceeds to step 222. If the P_REV in use by BTS1 106 is lower than the P_REV in use by BTS2 108, control flow proceeds to step 220 where BTS2 108 implements the lower P_REV in use by BTS1 106. Control flow then proceeds to step 222.

In step 222, BTS2 108 sends the MS 102 a message to commence soft handoff using a lower MOB_P_REV compatible with the signaling format of the lower P_REV of BTS1 106. Control flow proceeds to step 210.

In step 210, the MS 102 receives the message sent from BTS2 108 in step 222 instructing MS 102 to start the soft handoff. The signaling frame format in use by both BTS2 108 and BTS1 106 is the lower P_REV format of BTS1 106. Control flow proceeds to 212. The signaling frame format in use by the MS 102 is the lower MOB_P_REV compatible with the lower P_REV of BTS1 106.

In step 212, MS 102 performs soft handoff, combining the signals from both BTS1 106 and BTS2 108. The signaling frame format in use by both BTS1 106 and BTS2 108 is the lower P_REV format of BTS1 106. The signaling frame format in use by MS 102 is the lower MOB_P_REV compatible with the lower P_REV of BTS1 106. Control flow proceeds to step 204.

In step 204, BTS1 106 sends a Handoff Completion message to MS 102 informing MS 102 of cessation of transmissions from BTS1 106. The Handoff Completion message is formatted using the lower P_REV supported by BTS1 106. The signaling frame format in use by the MS 102 is the lower MOB_P_REV compatible with the lower P_REV of BTS1 106. Control flow proceeds to step 208.

In step 208, BTS1 106 stops transmission to MS 102. Control flow proceeds to step 214.

In step 214, MS 102 sends both BTS1 106 and BTS2 108 a Handoff Completion message to inform both BTS 106 and BTS 108 that MS 102 is no longer soft combining their signals. The signaling frame format in use by both BTS1 106 and BTS2 108 is the lower P_REV format of BTS1 106. The signaling frame format in use by the MS 102 is the lower MOB_P_REV compatible with the lower P_REV of BTS1 106. Control flow proceeds to step 224.

In step 224, BTS2 108 receives the Handoff Completion message sent by MS 102 in step 214. The signaling frame format in use by BTS2 108 is the lower P_REV format of BTS1 106. The signaling frame format in use by the MS 102 is the lower MOB_P_REV compatible with the lower P_REV of BTS1 106. Control flow proceeds to step 226.

In step 226, BTS2 108 determines if the P_REV number in use for the soft handoff has been downgraded to accommodate the soft handoff with BTS1 106. In other words, BTS2 108 determines whether it is currently, for soft handoff, supporting a lower P_REV than the P_REV it was using before the initiation of the soft handoff. If BTS2 108 had not downgraded its P_REV to accommodate the handoff, control flow proceeds to step 232, ending the BTS2 108 process. If BTS2 108 has downgraded its P_REV to accommodate the soft handoff, control flow proceeds to step 228.

In step 228, BTS2 108 sends MS 102 an Upgrade P_REV message indicating the P_REV number in use by BTS2 108 before BTS2 108 downgraded its P_REV to accommodate the soft handoff, and an action time for the MS 102 to upgrade its MOB_P_REV accordingly. The signaling frame format in use by BTS2 108 continues to be the lower P_REV format of BTS1 106. The signaling frame format in use by the MS 102 is the lower MOB_P_REV compatible with the lower P_REV of BTS1 106. Control flow proceeds to step 234.

In step 234, MS 102 receives the P_REV upgrade message sent from BTS2 108 in step 228 instructing MS 102 to upgrade its MOB_P_REV. Control flow proceeds to step 236.

In step 236, MS 102 upgrades its MOB_P_REV, either at an explicit action time or as soon as possible. Control flow proceeds to step 230.

In step 230, immediately or at the indicated action time, BTS2 108 reinstates the signaling frame format to the higher P_REV in use before the downgrade for soft handoff. All further signaling frames exchanged between BTS2 108 and MS 102 are exchanged at the higher P_REV supported by BTS2 108. Control flow proceeds to step 232, ending the process.

Figure 3:
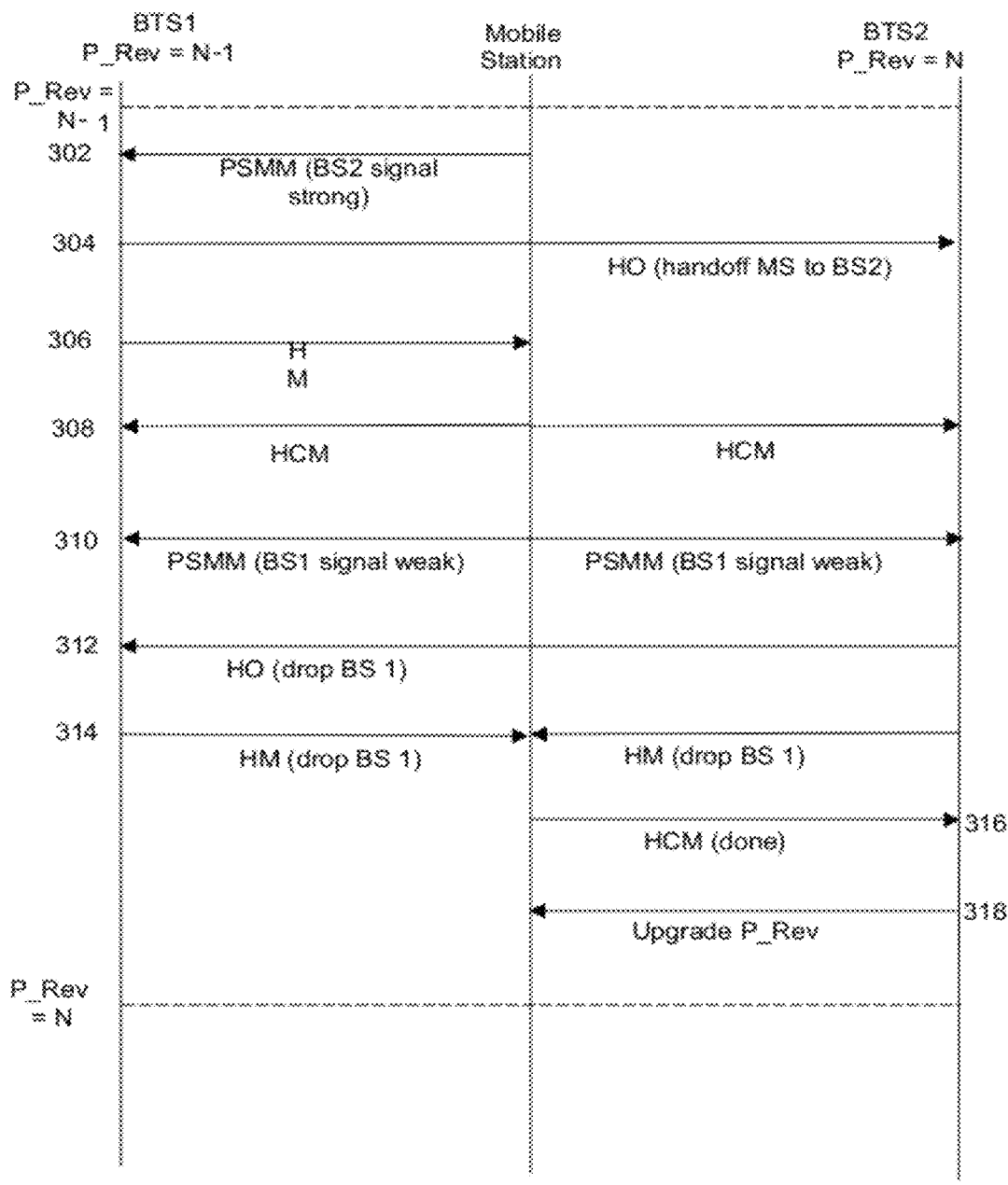
FIG. 3 illustrates the message flow between a mobile station and two base stations involved in a soft handoff where an origination base station supports a lower frame format protocol revision than an alternative base station, in accordance with an exemplary embodiment.

FIG. 3 illustrates the message flow between MS 102 and two base stations, BTS1 106 and BTS2 108, involved in a soft handoff. Origination base station BTS1 106 supports a lower frame format, P_REV N−1, than an alternative base station BTS2 108 that supports P_REV N, in accordance with an exemplary embodiment. One skilled in the art will understand that ordering of messages illustrated in FIG. 3 is not limiting. The method is readily amended by omission or re-ordering of the messages illustrated without departing from the scope of the disclosed embodiments. For simplicity, the illustrated message flows show partial message flows of well known soft handoff procedures. The disclosed embodiments are described in the context of CDMA phones. However, the disclosed embodiments are equally applicable to other modulation techniques.

In message exchange 302, MS 102 sends a Power Strength Measurement message to BTS1 106 indicating that it is receiving a stronger signal from BTS2 108 than from BTS1 106. BTS1 106 then sends a Handoff message to BTS2 108 requesting to handoff MS 102 to BTS2 108 in message exchange 304. The Handoff message 304 also notifies BTS2 108 of the P_REV (N−1) in use by BTS1 106. The signaling frame format in use by both BTS1 106 and BTS2 108 is the lower P-REV, N−1.

In Handoff message exchange 306, BTS1 106 communicates its P_REV (N−1) to MS 102. In message exchange 308, MS 102 performs soft handoff and sends Handoff Completion messages to BTS1 106 and BTS2 108, using a lower MOB_P_REV compatible with the lower P_REV (N−1) of BTS1 106. In message exchange 310 using the lower P_REV (N−1) of BTS1 106, the MS 102 sends Power Strength Measurement messages to BTS1 106 and BTS2 108 indicating that the signal it receives from BTS1 is weak.

In response to the Power Strength Measurement messages 310, BTS2 108 sends a Handoff message 312 to BTS1 106 directing BTS1 106 to drop the MS 102. The signaling frame format in use by both BTS1 106 and BTS2 108 is the lower P-REV, N−1. The signaling frame format in use by the MS 102 is the lower MOB_P_REV compatible with the lower P_REV of BTS1 106. BTS1 106 drops the MS 102.

In message exchange 314, both BTS1 106, and BTS2 108 send Handoff messages to the MS 102 indicating that BTS1 106 has been dropped. The signaling frame format in use by both BTS1 106 and BTS2 108 is the lower P-REV, N−1. The signaling frame format in use by the MS 102 is the lower MOB_P_REV compatible with the lower P_REV of BTS1 106.

After BTS1 106 is dropped, the MS 102 sends a Handoff Completion message 316 to BTS2 108, continuing to use the lower signaling frame format P_REV N−1. When BTS2 108 receives the Handoff Completion message 316 from the MS 102, it sends an Upgrade MOB_P_REV message 318 to the MS 102 using the lower P_REV N−1. The Upgrade P_REV message 318 contains the higher P_REV number N in use by BTS2 108 before soft handoff was initiated, and an action time as described above. After the action time, or as soon as possible, all signaling messages between MS 102 and BTS2 108 are exchanged using the higher signaling frame format, P_REV N. The signaling frame format in use by the MS 102 is the higher MOB_P_REV compatible with the higher P_REV of BTS2 108.

Figure 4A:
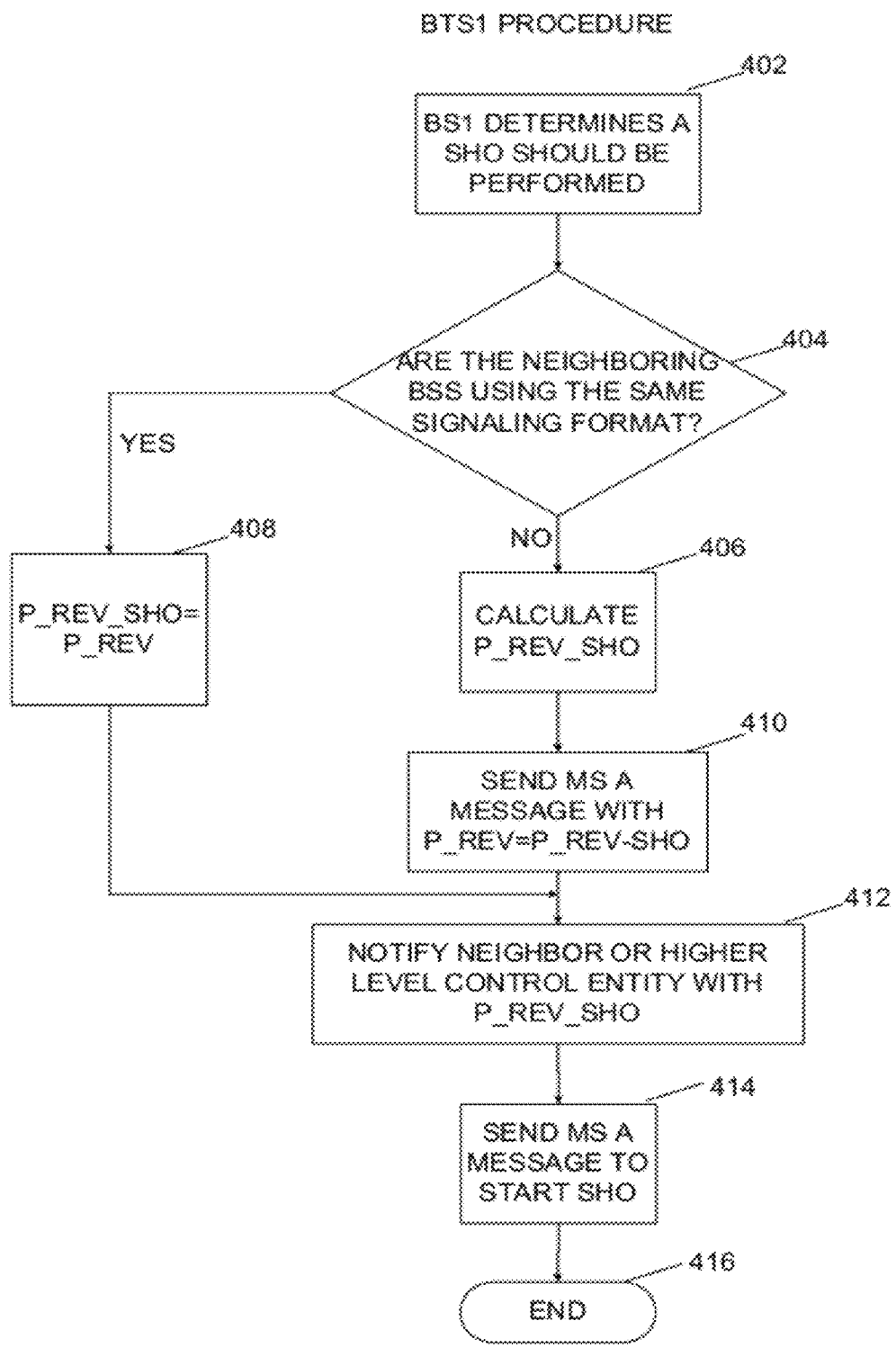
FIG. 4 is a flowchart illustrating steps of soft handoff from a base station supporting a higher frame format protocol revision to a base station supporting a lower protocol revision, in accordance with an exemplary embodiment.
Figure 4B:
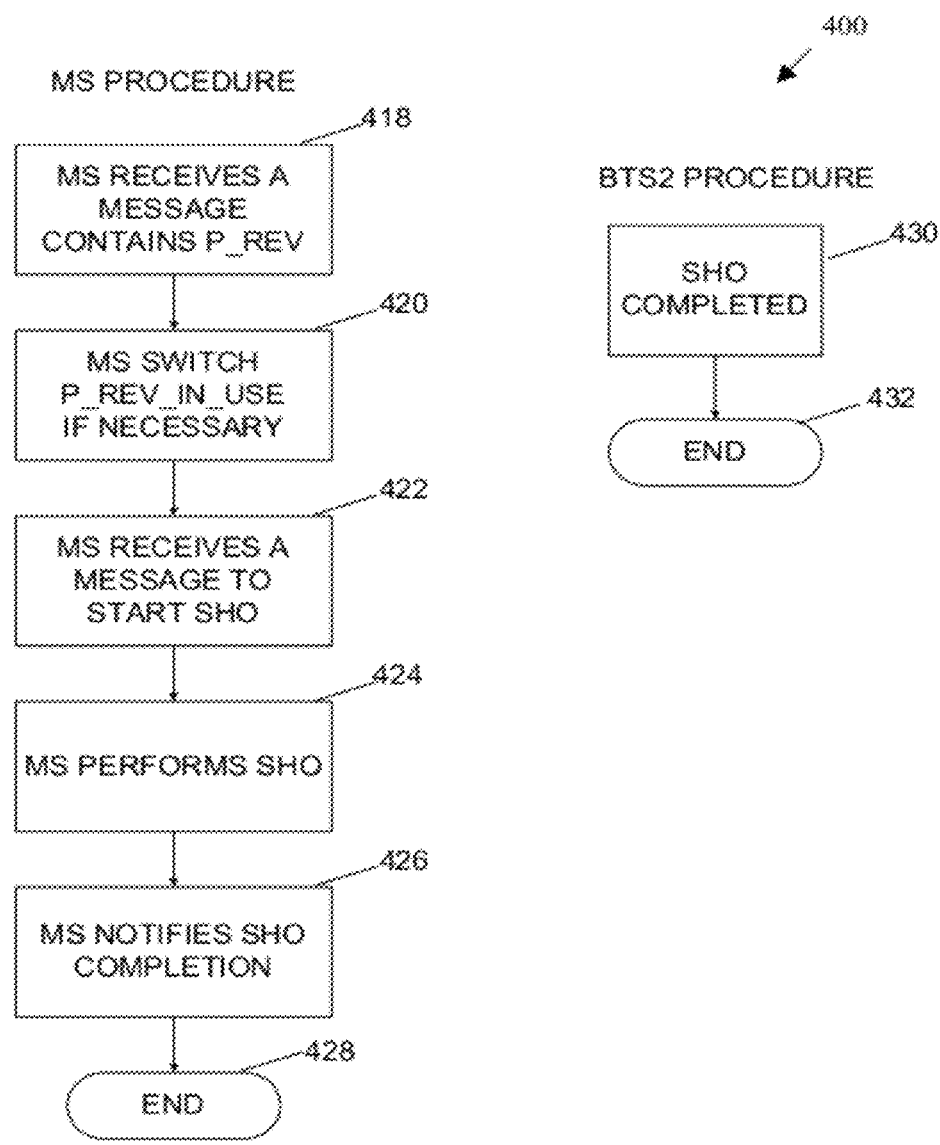

FIG. 4 is a flowchart 400 illustrating steps of soft handoff from an origination BTS1 106 supporting a higher P_REV than the P_REV of an alternative BTS2 108, in accordance with an exemplary embodiment. Backward compatibility of base stations allows the origination BTS1 106 supporting the higher P_REV to emulate the lower P_REV of the alternative BTS2 108 during the soft handoff. In an exemplary embodiment, origination BTS1 106 supporting a higher P_REV than BTS2 108 hands off to alternative BTS2 108 as follows: Origination BTS1 106 determines that a soft handoff is necessary and establishes the signaling formats, or P_REVs, of neighboring BTSs. BTS1 106 calculates the minimum P_REV of all the BTSs in a soft handoff active set. When the alternative BTS2 108 selected from the active set for handoff uses a lower P_REV than the origination BTS1 106, BTS1 106 signals the MS 102 to downgrade to a lower MOB_P_REV compatible with the lower P_REV of BTS2 108, and downgrades to the lower P_REV of BTS2 108 at a specified action time for the soft handoff. BTS1 106 notifies the alternative BTS2 108 or a higher level control entity such as BSC 104 to set up the soft handoff of MS 102. The alternative BTS2 108 or higher level control entity is supplied with the lower P_REV being used for soft handoff, or P_REV_SHO. P_REV_SHO designates the P_REV a BTS uses during soft handoff. The soft handoff is completed using the lower P_REV_SHO. The action time can be implicit or explicit. An explicit action time specifies the exact time for MS 102 to begin using the lower P_REV_SHO supported by BTS2 108. The explicit action time indicates the exact time that MS 102 will begin to soft combine signaling frames from both BTS1 106 and BTS2 108 upon initiation of handoff. An implicit action time implies implementation of the downgrade to the lower P_REV supported by BTS2 108 as soon as possible. Because the format difference only applies to the signaling portion of the frame, rather than the voice traffic portion of the frame, voice quality is not impacted by the loss of any signaling frames caused by delay in the downgrade due to an implicit action time.

Soft handoff from an origination BTS1 106 to alternative BTS2 108, which supports a lower P_REV than BTS1 106, begins in step 402 with BTS1 106 determining a soft handoff should be performed. Control flow proceeds to step 404.

In step 404, BTS1 106 establishes whether the neighboring BTSs are using the same P_REV as BTS1 106. If the neighboring BTSs are using the same P_REV as BTS1 106, P_REV_SHO is set to the current P_REV of BTS1 106 in step 408 and control flow proceeds to step 412. If the neighboring BTSs are not using the same P_REV as BTS1 106, control flow proceeds to step 406.

In step 406, P_REV_SHO is calculated to be the minimum P_REV of all the BTSs in the soft handoff active set. Control flow proceeds to step 410.

In step 410, BTS1 106 notifies the MS 102 of the P_REV_SHO to use during the soft handoff procedure. Control flow proceeds to step 418.

In step 418, the MS 102 receives the notification sent by BTS1 106 in step 410. Control flow proceeds to step 420.

In step 420, the MS 102 downgrades to a lower MOB_P_REV compatible with P_REV_SHO, or the lower P_REV in use by BTS2 108 if necessary. Control flow proceeds to step 412.

In step 412, BTS1 106 supplies alternative BTS2 108 or a higher level control entity such as BSC 104 with the lower P_REV being used for soft handoff. Control flow proceeds to step 414.

In step 414, BTS1 106 sends MS 102 a message instructing MS 102 to start soft handoff, combining the signals from BTS1 106 and BTS2 108. The signaling frame format in use is the lower P_REV format of BTS2 108. The signaling frame format of the MS 102 is the lower MOB_P_REV compatible with P_REV_SHO. The BTS1 106 procedure then ends in step 416. Control flow proceeds to MS 102 procedure step 422.

In step 422, the MS 102 receives the message to start soft handoff sent by BTS1 106 in step 414. The signaling frame format in use is the lower P_REV format of BTS2 108. Control flow proceeds to step 424.

In step 424, the MS 102 performs the soft handoff to BTS2 108. The signaling frame format in use is the lower P_REV format of BTS2 108. Control flow proceeds to step 426.

In step 426, the MS 102 sends BTS2 108 a Handoff Completion message notifying BTS2 108 that soft handoff is complete. The mobile station procedure then ends in step 428. Control flow proceeds to BTS2 108 procedure step 430.

In step 430, BTS2 108 receives the handoff completion message sent by the MS 102 in step 426. BTS2 108 is notified of the completion of soft handoff. All further signaling frames exchanged between BTS2 108 and MS 102 are exchanged at the lower P_REV=N−1 supported by BTS2 108. Control flow proceeds to step 432, ending the soft handoff process.

Figure 5:
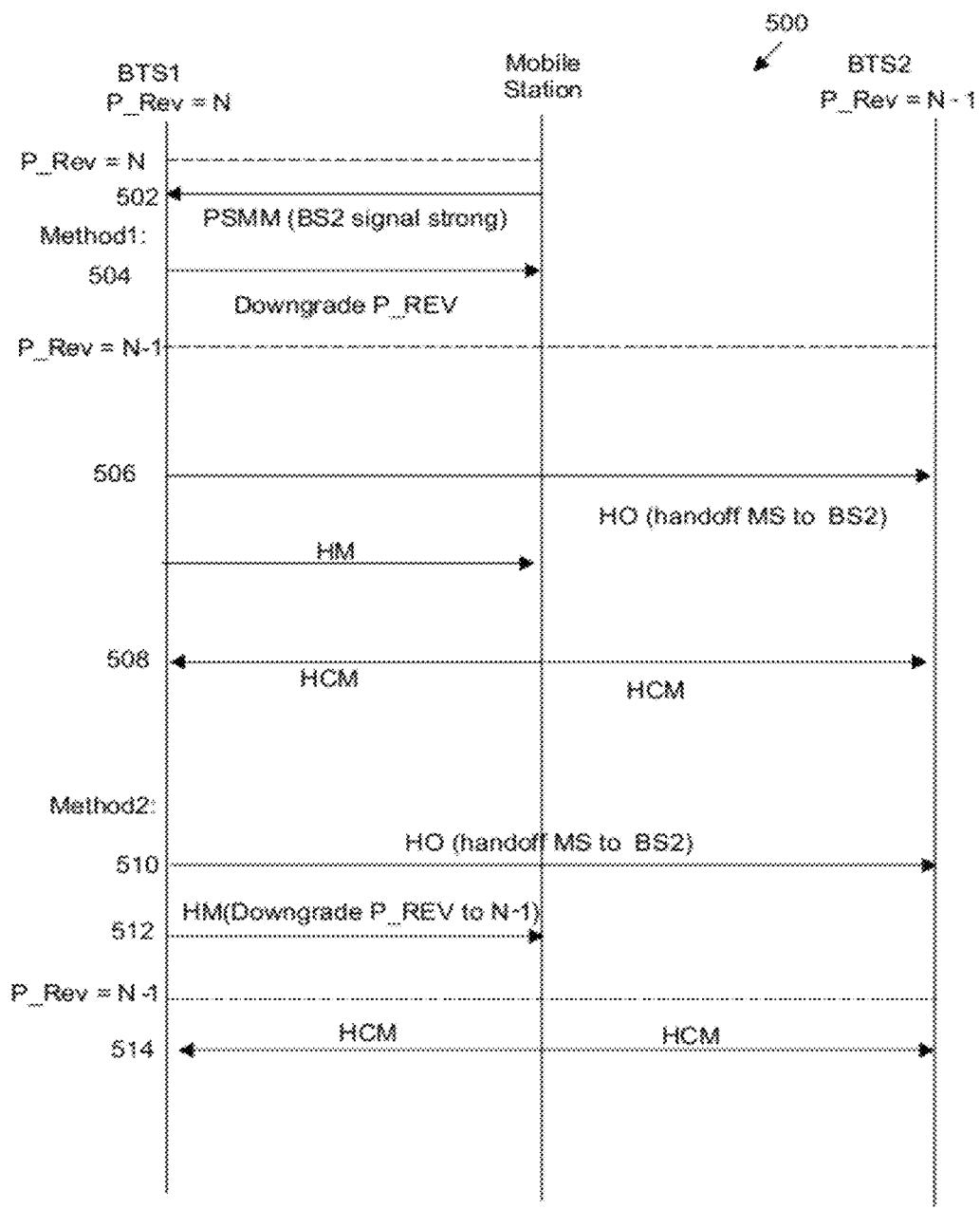
FIG. 5 illustrates the message flow between a mobile station and two base stations involved in a soft handoff where an origination base station supports a higher frame format protocol revision than an alternative base station, in accordance with an exemplary embodiment.

FIG. 5 illustrates the message flow between a mobile station and two base stations involved in a soft handoff where an origination base station supports a higher P_REV than an alternative base station, in accordance with exemplary embodiments method 1 and method 2. One skilled in the art will understand that ordering of messages illustrated in FIG. 5 is not limiting. The methods are readily amended by omission or re-ordering of the messages illustrated without departing from the scope of the disclosed embodiments. For simplicity, the illustrated message flows show partial message flows of well known soft handoff procedures. The disclosed embodiments are described in the context of CDMA phones. However, the disclosed embodiments are equally applicable to other modulation techniques.

Method 1 begins with message exchange 502. In message exchange 502, MS 102 sends a Power Strength Measurement message to BTS1 106 indicating that it is receiving a stronger signal from BTS2 108 than from BTS1 106. BTS1 106 sends a Downgrade P_REV message 504 to the MS 102 using the higher signaling frame format, P_REV N. The Downgrade P_REV message 504 contains the P_REV number N−1, the lower P_REV supported by BTS2 108, and an action time as described above. After the action time, all signaling messages between the MS 102 and BTS2 108 are exchanged using the lower signaling frame format.

BTS1 106 then sends a Handoff message to BTS2 108 requesting to handoff MS 102 to BTS2 108 in message exchange 506. The signaling frame format in use by both BTS1 106 and BTS2 108 is the lower P-REV N−1. The signaling frame format of the MS 102 is the lower MOB_P_REV compatible with P_REV_SHO.

In message exchange 508, MS 102 performs soft handoff and sends Handoff Completion messages 510 to BTS1 106 and BTS2 108, using the lower P_REV (N−1) of BTS2 108.

All further signaling message exchanges between MS 102 and BTS2 108 are exchanged at the lower P_REV of BTS2 108 and the lower MOB_P_REV compatible with the lower P_REV of BTS2 108.

In accordance with another exemplary embodiment of soft handoff from an origination BTS1 106 supporting a higher P_REV than an alternative BTS2 108, method 2 begins with message exchange 514. In message exchange 514, BTS1 106 sends a Handoff message to BTS2 108 requesting to handoff MS 102 to BTS2 108. BTS1 106 then sends a Downgrade P_REV message 512 containing the P_REV number N−1, the lower P_REV supported by BTS2 108, and an action time as described above. MS 102 downgrades to PREV=N−1 and communicates with BTS1 106 and BTS2 108 using the lower P_REV of BTS2 108. MS 102 performs soft handoff and sends Handoff Completion messages 514 to BTS1 106 and BTS2 108, using the lower P_REV (N−1) of BTS2 108. All further signaling message exchanges between MS 102 and BTS2 108 are exchanged at the lower P_REV of BTS2 108 and the lower MOB_P_REV compatible with the lower P_REV of BTS2 108.

Figure 6:
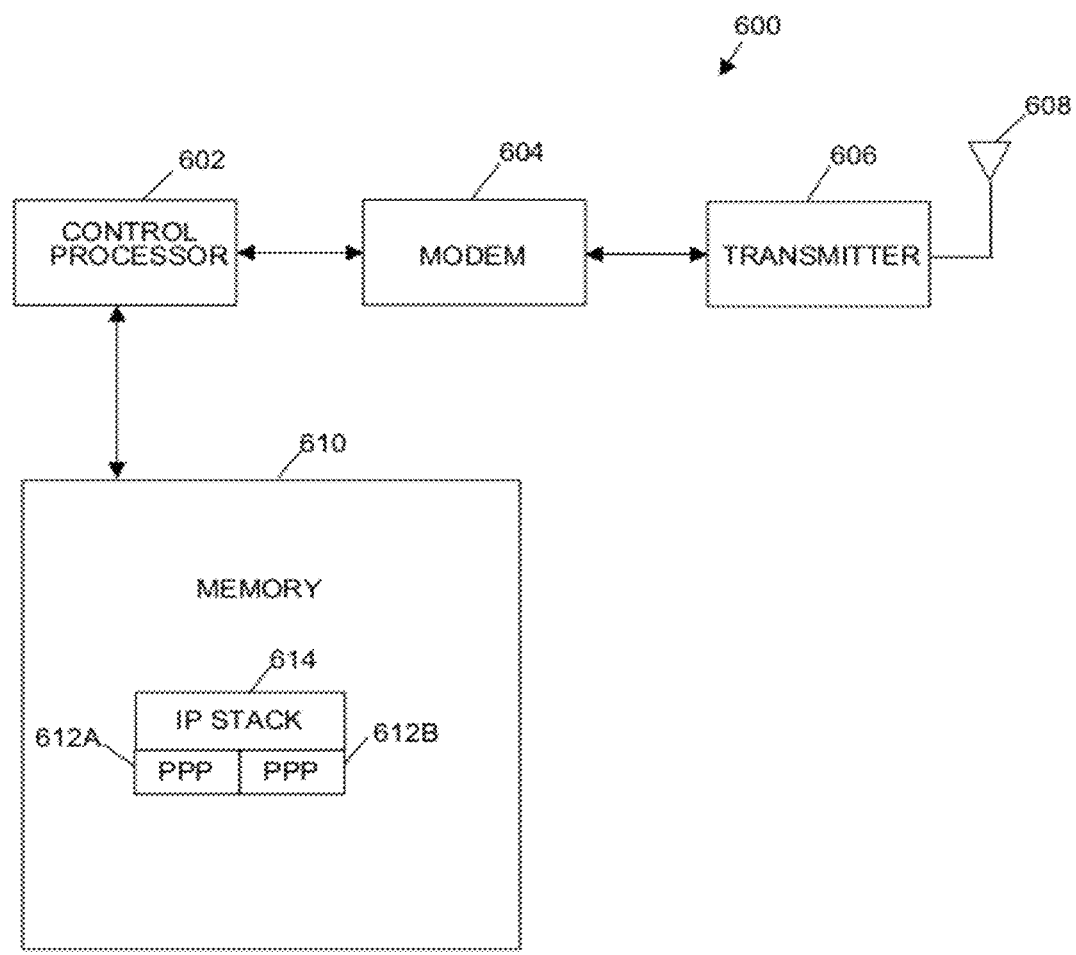
FIG. 6 is a diagram of an exemplary mobile station apparatus capable of soft handoff between base stations using different frame format protocol revisions.

FIG. 6 is a diagram of an exemplary mobile station apparatus capable of soft handoff between base stations using different frame format protocol revisions. A control processor 602 establishes a wireless connection through a wireless modem 604, transmitter 606, and antenna 608 as shown. In an exemplary embodiment, the wireless modem 604 and transmitter 606 operate in accordance with the cdma2000 specification. Alternatively, the wireless modem 604 and transmitter 606 could operate in accordance with other wireless standards such as IS-95, W-CDMA, or EDGE.

The control processor 602 is connected to a memory 610 having code or instructions directing the control processor 602 to upgrade or downgrade the MOB_P_REV in use during soft handoff according to received messages in order to enable soft handoff between base stations using different signaling frame formats. The memory 610 may include RAM memory, flash memory, ROM memory, EPROM memory, EEPROM memory, registers, hard disk, a removable disk, a CD-ROM, or any other form of storage medium or computer readable media known in the art.

In an exemplary embodiment, the control processor 602 executes instructions stored in memory 610 to upgrade to a specified higher MOB_P_REV at a given action time, in response to a received message. The control processor 602 then executes instructions stored in memory 610 to combine signals from two or more base stations at the specified MOB_P_REV. In another embodiment, the control processor 602 executes instructions stored in memory 610 to downgrade to a specified lower MOB_P_REV at a given action time, in response to a received message. The control processor 602 then executes instructions stored in memory 610 to combine signals from two or more base stations at the specified MOB_P_REV.

Figure 7:
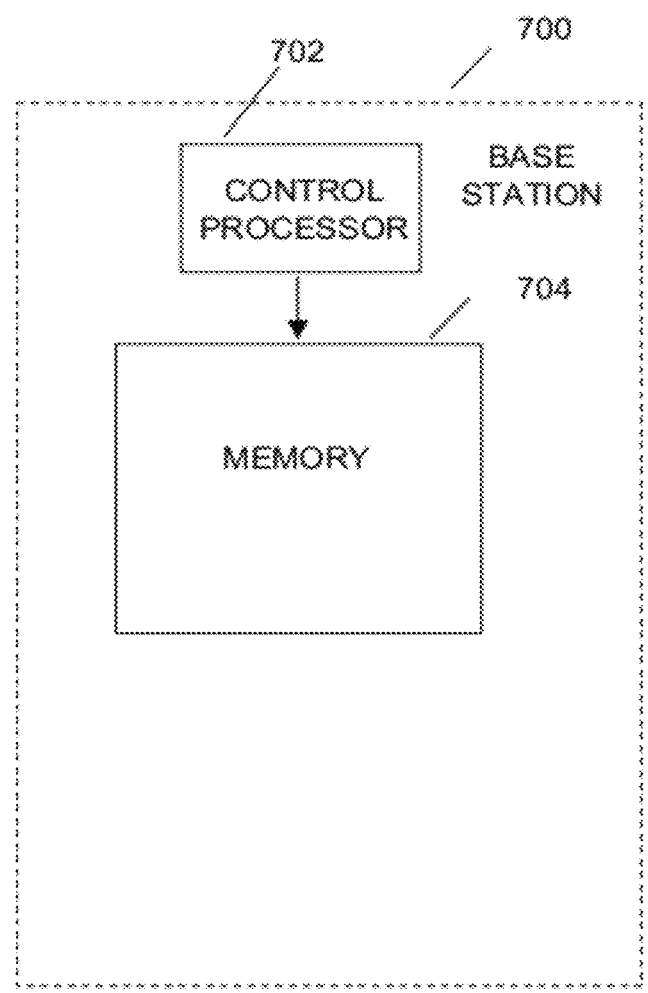
FIG. 7 is a diagram of an exemplary base station apparatus capable of soft handoff with another base station supporting a different frame format protocol revision.

FIG. 7 is a diagram of an exemplary base station apparatus 700 capable of soft handoff of a Mobile Station, supporting different frame format protocol revisions. The Base Station 700 comprises a control processor 702 and memory 704 containing code or instructions directing the control processor 702 to upgrade or downgrade the P_REV in use during soft handoff in order to enable soft handoff between base stations using different signaling frame formats. The memory 704 may include RAM memory, flash memory, ROM memory, EPROM memory, EEPROM memory, registers, hard disk, a removable disk, a CD-ROM, or any other form of storage medium or computer readable media known in the art.

In an exemplary embodiment, the control processor 702 executes instructions stored in memory 704 to notify an alternative base station to set up a soft handoff specifying its P_REV currently in use.

In another exemplary embodiment, the control processor 702 executes instructions stored in memory 704 to determine whether the P_REV used by another base station requesting soft handoff of a mobile station is lower than its own current P_REV. If so, control processor 702 executes instructions stored in memory 704 to downgrade to the lower PREV for the duration of the soft handoff.

In another exemplary embodiment, control processor 702 executes instructions stored in memory 704 to calculate the minimum P_REV of all the base stations in the soft handoff active set. When an alternative base station using a lower P_REV is selected from the active set, control processor 702 executes instructions stored in memory 704 to signal the mobile station to downgrade its MOB_P_REV, and downgrades its P_REV to the lower P_REV of the alternative base station. Control processor 702 then executes instructions stored in memory 704 to notify the alternative base station or a higher level entity of the P_REV used for the duration of the soft handoff.

In another exemplary embodiment, control processor 702 executes instructions stored in memory 704 to determine whether the MOB_P_REV used by a mobile station is higher than its own current P_REV. If so, control processor 702 executes instructions stored in memory 704 to send the mobile station a message indicating the P_REV.

Thus, a novel and improved method and apparatus for soft handoff between base stations using different signaling frame formats have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a Mobile Station. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wireless communication, comprising:
   providing a message to a first base station utilizing a first protocol data unit format revision, the message indicating that a signal received from a second base station utilizing a second protocol data unit format revision that is higher than the first protocol data unit format revision is stronger than a signal received from the first base station, the second protocol data unit format revision having a different frame signal format than the first protocol data unit format revision;
   soft-combining messages from the first base station and the second base station during a handoff from the first base station to the second base station, wherein the messages from each of the first base station and the second base station are in accordance with the first protocol data unit format revision with the same frame signal format; and
   communicating with the second base station utilizing the second protocol data unit format revision following the handoff from the first base station to the second base station.

2. The method of claim 1, further comprising:
   receiving an indication from the second base station to upgrade to the second protocol data unit format revision after the handoff from the first base station to the second base station.

3. The method of claim 2, wherein the indication comprises an identification of an explicit action time specifying a time to begin utilizing the second protocol data unit format revision.

4. The method of claim 2, wherein the indication comprises an identification of an implicit action time requesting that the upgrade to the second protocol data unit format revision commence as soon as possible.

5. A method of wireless communication, comprising:
   providing a message to a first base station utilizing a first protocol data unit format revision, the message indicating that a signal received from a second base station utilizing a second protocol data unit format revision that is lower than the first protocol data unit format revision is stronger than a signal received from the first base station, the second protocol data unit format revision having a different frame signal format than the first protocol data unit format revision;
   soft-combining messages from the first base station and the second base station during a handoff from the first base station to the second base station, wherein the messages from each of the first base station and the second base station are in accordance with the second protocol data unit format revision with the same frame signal format; and
   communicating with the second base station utilizing the second protocol data unit format revision following the handoff from the first base station to the second base station.

6. The method of claim 5, further comprising:
   receiving an indication from the first base station to downgrade to the second protocol data unit format revision before the handoff from the first base station to the second base station.

7. The method of claim 6, wherein the indication comprises an identification of an explicit action time specifying a time to begin utilizing the second protocol data unit format revision.

8. The method of claim 6, wherein the indication comprises an identification of an implicit action time requesting that the downgrade to the second protocol data unit format revision commence as soon as possible.

9. An apparatus for wireless communication, comprising:
   means for providing a message to a first base station utilizing a first protocol data unit format revision, the message indicating that a signal received from a second base station utilizing a second protocol data unit format revision that is higher than the first protocol data unit format revision is stronger than a signal received from the first base station, the second protocol data unit format revision having a different frame signal format than the first protocol data unit format revision;
   means for soft-combining messages from the first base station and the second base station during a handoff from the first base station to the second base station, wherein the messages
   from each of the first base station and the second base station are in accordance with the first protocol data unit format revision with the same frame signal format; and
   means for communicating with the second base station utilizing the second protocol data unit format revision following the handoff from the first base station to the second base station.

10. The apparatus of claim 9, further comprising:
    means for receiving an indication from the second base station to upgrade to the second protocol data unit format revision after the handoff from the first base station to the second base station.

11. The apparatus of claim 10, wherein the indication comprises an identification of an explicit action time specifying a time to begin utilizing the second protocol data unit format revision.

12. The apparatus of claim 10, wherein the indication comprises an identification of an implicit action time requesting that the upgrade to the second protocol data unit format revision commence as soon as possible.

13. An apparatus for wireless communication, comprising:
    means for providing a message to a first base station utilizing a first protocol data unit format revision, the message indicating that a signal received from a second base station utilizing a second protocol data unit format revision that is lower than the first protocol data unit format revision is stronger than a signal received from the first base station, the second protocol data unit format revision having a different frame signal format than the first protocol data unit format revision;

means for soft-combining messages from the first base station and the second base station during a handoff from the first base station to the second base station, wherein the messages from each of the first base station and the second base station are in accordance with the second protocol data unit format revision with the same frame signal format; and means for communicating with the second base station utilizing the second protocol data unit format revision following the handoff from the first base station to the second base station.

14. The apparatus of claim 13, further comprising: means for receiving an indication from the first base station to downgrade to the second protocol data unit format revision before the handoff from the first base station to the second base station.

15. The apparatus of claim 13, wherein the indication comprises an identification of an explicit action time specifying a time to begin utilizing the second protocol data unit format revision.

16. The apparatus of claim 13, wherein the indication comprises an identification of an implicit action time requesting that the downgrade to the second protocol data unit format revision commence as soon as possible.

17. A computer program product apparatus, comprising:
a non-transitory computer-readable medium comprising code for:
providing a message to a first base station utilizing a first protocol data unit
format revision, the message indicating that a signal received from a second base station utilizing a second protocol data unit format revision that is higher than the first protocol data unit format revision is stronger than a signal received from the first base station, the second protocol data unit format revision having a different frame signal format than the first protocol data unit format revision;
soft-combining messages from the first base station and the second base station during a handoff from the first base station to the second base station, wherein the messages from each of the first base station and the second base station are in accordance with the first protocol data unit format revision with the same frame signal format; and
communicating with the second base station utilizing the second protocol data unit format revision following the handoff from the first base station to the second base station.

18. A computer program product apparatus, comprising:
a non-transitory computer-readable medium comprising code for:
providing a message to a first base station utilizing a first protocol data unit
format revision, the message indicating that a signal received from a second base station utilizing a second protocol data unit format revision that is lower than the first protocol data unit format revision is stronger than a signal received from the first base station, the second protocol data unit format revision having a different frame signal format than the first protocol data unit format revision;
soft-combining messages from the first base station and the second base station during a handoff from the first base station to the second base station, wherein the messages from each of the first base station and the second base station are in accordance with the second protocol data unit format revision with the same frame signal format; and
communicating with the second base station utilizing the second protocol data unit format revision following the handoff from the first base station to the second base station.

19. An apparatus for wireless communication, comprising:
at least one processor; and
a memory coupled to the at least one processor, wherein the at least one processor is configured to:
provide a message to a first base station utilizing a first protocol data unit format revision, the message indicating that a signal received from a second base station utilizing a second protocol data unit format revision that is higher than the first protocol data unit format revision is stronger than a signal received from the first base station, the second protocol data unit format revision having a different frame signal format than the first protocol data unit format revision;
soft-combine messages from the first base station and the second base station during a handoff from the first base station to the second base station, wherein the messages from each of the first base station and the second base station are in accordance with the first protocol data unit format revision with the same frame signal format; and
communicate with the second base station utilizing the second protocol data unit format revision following the handoff from the first base station to the second base station.

20. An apparatus for wireless communication, comprising:
at least one processor; and
a memory coupled to the at least one processor, wherein the at least one processor is configured to:
provide a message to a first base station utilizing a first protocol data unit format revision, the message indicating that a signal received from a second base station utilizing a second protocol data unit format revision that is lower than the first protocol data unit format
revision is stronger than a signal received from the first base station, the second protocol data
unit format revision having a different frame signal format than the first protocol data unit format revision;
soft-combine messages from the first base station and the second base station during a handoff from the first base station to the second base station, wherein the messages from each of the first base station and the second base station are in accordance with the second protocol data unit format revision with the same frame signal format; and
communicate with the second base station utilizing the second protocol data unit format revision following the handoff from the first base station to the second base station.

* * * * *